E. F. ROURKE.
NUT AND BOLT LOCK.
APPLICATION FILED SEPT. 23, 1913.

1,150,149.

Patented Aug. 17, 1915.

WITNESSES:

INVENTOR.

UNITED STATES PATENT OFFICE.

EUGENE F. ROURKE, OF CAMDEN, NEW JERSEY.

NUT AND BOLT LOCK.

1,150,149. Specification of Letters Patent. Patented Aug. 17, 1915.

Application filed September 23, 1913. Serial No. 791,325.

*To all whom it may concern:*

Be it known that I, EUGENE F. ROURKE, a citizen of the United States, residing at No. 625 Spruce street, Camden, in the county of Camden and State of New Jersey, have invented a new and useful Nut and Bolt Lock, of which the following is a specification.

My invention relates to improvements in nut and bolt locks; and the objects of my invention are to provide a simple device for securing a nut and a bolt that is practical and that can be cheaply manufactured.

I attain these objects by the mechanism illustrated in the accompanying drawing in which—

Figures 1, 2:
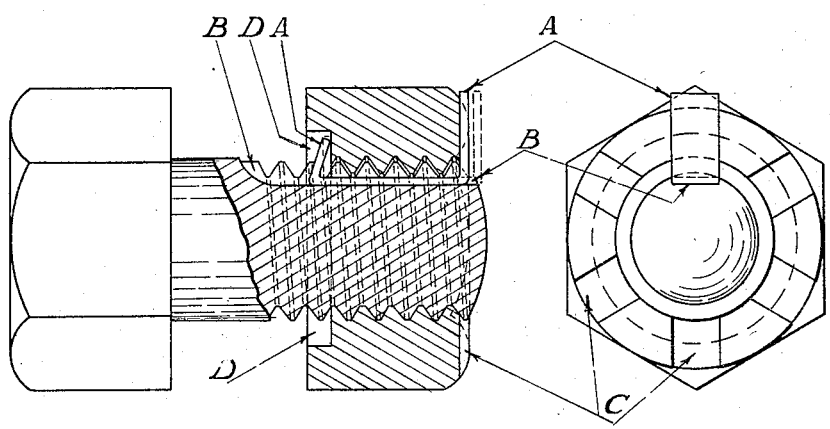

Figure 1 is a longitudinal sectional view of the adjusting and locking device for threaded mechanism applied to a bolt and nut; Fig. 2 is a view of one end of the nut showing grooves or keyways in the nut or female threaded part and the key locked in one of the grooves or keyways, also the countersunk or circular recess in the other end of the nut or female threaded part (shown dotted), and Fig. 3 the adjusting and locking device for threaded mechanism applied to a screw.

Similar letters refer to similar parts throughout the several views.

"A" designates the key made of flat spring material of rectangular section; "B" the keyway or groove in the male threaded part; "C" the keyways or grooves in one end of the female threaded part; and "D" the countersunk or circular recess in the other end of the female threaded part.

"A" the key, Fig. 1, is bent to a right angle at one end so as to fit and lock in keyways or grooves "C" in the female threaded part, and bent to an acute angle at the other end to allow the key to spring and rise out of keyways or grooves "C."

The bolt and nut in Fig. 1 is shown adjusted and locked, and is unlocked and readjusted by forcing a wedge shape tool in the keyway or groove "C" and under key "A", the acute angle at the other end is caused to assume a right angle, the key "A" sliding freely through keyway "B" and rising out of keyway "C" (shown dotted), permits of the readjustment of the nut to any desired location on the bolt, the end of key "A" sliding freely in a circle in the countersunk or circular recess "D"; after the readjustment of the nut on the bolt remove the wedge shape tool from under key "A", the key A springing automatically into the desired keyway or groove "C" securely locking bolt and nut.

In Fig. 2 is shown the key "A" locked in one of the keyways "C", the number of keyways "C" being one or more according to the desired accuracy in the adjustment, also the countersunk or circular recess "D" in other end of nut (shown dotted), the depth and diameter being made to suit the end of key "A" bent to an acute angle.

Figure 3:
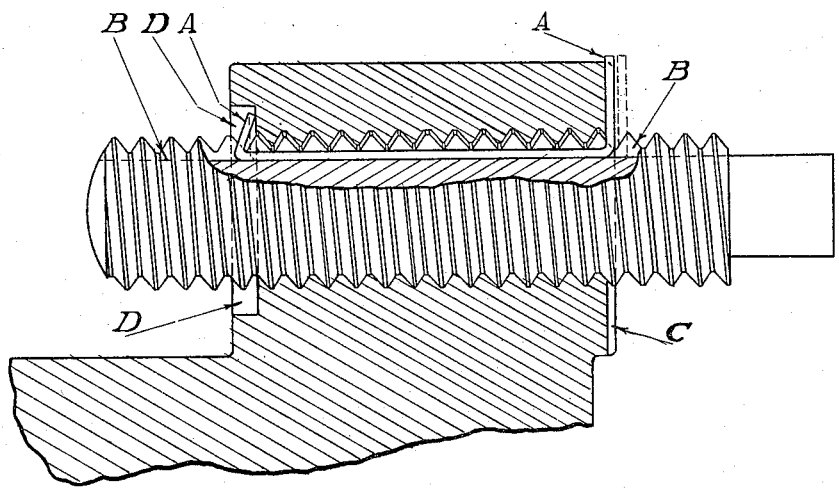

In Fig. 3 the screw is shown adjusted and locked in the machine or female threaded part, and is unlocked and readjusted by forcing wedge shape tool in the keyway or groove "C" and under key "A", causing the acute angle to spring to a right angle and thus permit of the other or right angular end being drawn outwardly of the groove C to permit of the readjustment of the screw to any desirable location in the machine or female threaded part when the wedge is removed the key "A" will spring automatically into the desired keyway or groove "C" thus securely locking the screw in the machine or female threaded part.

Having thus described the invention what I claim is:—

1. The combination of a male threaded member having a longitudinally extending groove, a female member threaded upon the male member, said female member having one of its faces provided with an annular recess and its second and outer face provided with a plurality of recesses radiating from the axial bore of the said member, a key arranged within the groove of the male member, said key being constructed of resilient material and having one of its ends bent at an acute angle and contacting with the wall provided by the annular recess in the rear face of the nut, the second and outer end of the key being formed with a right angular member which is adapted to be received within one of the grooves upon the outer face of the nut, and the said angular ends of the key adapted to exert a tension between each other to retain the body of the key in the groove of the male member and the right angular end of the said key in the groove provided in the outer face of the nut.

2. In combination, a bolt having its threaded shank provided with a longitudinally extending groove, a nut for the bolt, said nut having its rear face provided with an annular recess, the inner wall provided by the said recess being planed, the outer face of the nut being provided with radially disposed recesses each approximately corresponding in width to that of the groove in the bolt, a key constructed of a single piece of spring metal adapted to have its body portion arranged within the groove in the bolt, said key having one of its ends disposed at an acute angle and contacting the inner plane wall of the annular recess, the second end of the key having a right angular extension which is received in one of the radial recesses in the outer face of the nut, the said right angular end extending beyond the periphery of the nut to permit of a pull thereon to bring the acute angular end of the key approximately to a right angle to its body to permit of the nut being rotated upon the bolt.

In virtue whereof I have hereunto set my hand this 20th day of September 1913.

EUGENE F. ROURKE.

Witnesses:
R. C. CORSON,
G. M. MORRIS, Jr.